(12) United States Patent
Jian et al.

(10) Patent No.: US 11,223,379 B2
(45) Date of Patent: Jan. 11, 2022

(54) FRONT-END ARCHITECTURE OF MULTIBAND RADIO

(71) Applicant: Telefonaktiebolaget LM Ericsson (publ), Stockholm (SE)

(72) Inventors: Chunyun Jian, Ottawa (CA); Lixia Chen, San Jose, CA (US); Mi Zhou, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/970,202

(22) PCT Filed: Mar. 2, 2018

(86) PCT No.: PCT/IB2018/051344
§ 371 (c)(1),
(2) Date: Aug. 14, 2020

(87) PCT Pub. No.: WO2019/166863
PCT Pub. Date: Sep. 6, 2019

(65) Prior Publication Data
US 2021/0083702 A1    Mar. 18, 2021

(51) Int. Cl.
*H04B 1/10* (2006.01)
*H04B 1/00* (2006.01)

(52) U.S. Cl.
CPC ......... *H04B 1/1036* (2013.01); *H04B 1/0057* (2013.01)

(58) Field of Classification Search
CPC .............................. H04B 1/1036; H04B 1/0057
See application file for complete search history.

(56) References Cited

U.S. PATENT DOCUMENTS

| 6,745,046 B1 * | 6/2004 | Eckert ................... H04B 1/406 |
| | | 343/702 |
| 6,917,815 B2 | 7/2005 | Hajimiri et al. |
| 7,315,730 B2 | 1/2008 | Galan |
| 8,952,769 B2 * | 2/2015 | Berry .................... H01P 7/105 |
| | | 333/202 |

(Continued)

FOREIGN PATENT DOCUMENTS

| EP | 1381163 B1 | 3/2005 |
| WO | 2009016454 A2 | 2/2009 |

*Primary Examiner* — Dominic E Rego
(74) *Attorney, Agent, or Firm* — Sage Patent Group

(57) ABSTRACT

A multiband radio (108) is presented that includes front-end architecture that can produce a substantial size/weight/cost reduction on the necessary air cavity multiband receive filter design of existing multiband radio (108)s. In particular, the disclosure presents a multiband radio (108) configured to filter a set of sub-bands of a multiband uplink signal. In an aspect, the multiband radio (108) includes one or more wideband filters (206) configured to filter any group of two or more adjacent sub-bands in a frequency spectrum utilized by the multiband radio (108) for communication with one or more user equipment (UE). In addition, the multiband radio (108) includes a multiplexer (343, 542) configured to isolate each of the uplink sub-bands using separate filters (340, 540). Furthermore, the multiband radio (108) includes a plurality of single sub-band filters (410), each of the plurality of single sub-band filters (410) configured to filter a different isolated uplink sub-band in the frequency spectrum.

28 Claims, 8 Drawing Sheets

(56) References Cited

U.S. PATENT DOCUMENTS

| | | |
|---|---|---|
| 2004/0014435 A1 | 1/2004 | Woo et al. |
| 2009/0088124 A1 | 4/2009 | Schuur et al. |
| 2010/0054227 A1* | 3/2010 | Hettstedt .............. H04W 88/085 370/343 |
| 2011/0227665 A1* | 9/2011 | Wyville ............... H04B 1/1027 333/17.1 |
| 2013/0225101 A1* | 8/2013 | Basaran .................... H03H 7/12 455/79 |
| 2014/0185498 A1* | 7/2014 | Schwent ................... H04L 5/02 370/297 |
| 2014/0194074 A1 | 7/2014 | Klomsdorf et al. |
| 2015/0280656 A1* | 10/2015 | Kim .................... H03F 3/45179 455/90.2 |
| 2016/0013820 A1* | 1/2016 | Yamanouchi ........ H04B 1/0475 375/297 |
| 2017/0317711 A1 | 11/2017 | Jian et al. |
| 2018/0159563 A1* | 6/2018 | Khlat ....................... H01Q 5/50 |

* cited by examiner

FRONT-END ARCHITECTURE OF MULTIBAND RADIO

BACKGROUND

Existing 3G and 4G broadband wireless communication networks are widely deployed in the world. For new deployment or network upgrade, multiband base station radio gradually becomes wireless network operator's favorite choice. Moreover, there is a greater market demand for base station radios that utilize multiple inputs and multiple outputs (MIMO), such as 2T2R, 4T4R or 4T4R (where xTyR represents x transmitters and y receivers), than single-input and/or single-output radios (i.e., 1T1R, 1T2R devices). For the upcoming Fifth-Generation (5G) wireless network, substantially more complex MIMO configurations are proposed, such as 64T64R Active Antenna System (AAS) or 128T128R AAS.

Currently, the radios of wireless base stations (e.g., nodeBs, enhanced nodeBs (eNBs), etc.) transmit signals with a power that is much higher than the user equipment (UEs) they serve. As a result, the downlink (DL) and uplink (UL) front-end filters of these existing base stations must be designed by using high-Q and high-power-handling air cavity filter technology. These air cavity multiband transmit (TX) and receive (RX) filters are designed by using two band-combining circuits and individual single-band TX or RX filters. The air cavity multiband TX and RX filters are usually designed together and built in one unit, and normally the unit is referred to as an air cavity multiband duplexer.

Conventional radio frequency (RF) front-end filter architectures for the multiband RF radios utilizing these air cavity multiband duplexers find that these components hold a large share of the entire radio unit size, weight, and cost. For example, for a conventional dual-band radio, the size ratio of the air cavity dual-band duplexer to the entire radio is approximately 1:3. Exacerbating the feasibility problem for these components going forward is the fact that size of the radio is proportional to the number of sub-bands supported by a multiband radio Therefore, an innovative design approach that enables a reduction of the size, weight, and cost of the necessary air cavity multiband duplexer is needed by those in the wireless network industry who deploy radio base station units.

SUMMARY

The present disclosure presents a wireless receiver having front-end multiband filter architecture that can produce a substantial size, weight, cost reduction on the necessary air cavity multiband receive filter design of multiband radios. Likewise, the disclosure describes example network nodes and radios that use the architecture, as well as methods performed by these devices.

For instance, described herein is an example multiband radio (and a network node as well as a wireless communication device containing the multiband radio) configured to filter a set of uplink sub-bands in a wireless communication system. In an aspect, the multiband radio includes one or more wideband filters, where each of the wideband filters are configured to filter any group of two or more adjacent sub-bands in a frequency spectrum utilized by the multiband radio for communication with a user equipment (UE). In addition, the multiband radio includes a multiplexer configured to isolate each of the adjacent uplink sub-bands bands using separate filters. Furthermore, the multiband radio includes a plurality of single sub-band filters, each of the plurality of single sub-band filters configured to filter a different isolated uplink sub-band in the frequency spectrum.

Moreover, the present disclosure contemplates an example method performed by a multiband radio for filtering a set of uplink sub-bands in a wireless communication system. The example method can include filtering, by a wideband filter, any group of two or more adjacent uplink sub-bands in a frequency spectrum utilized by the multiband radio for communication with a UE. Additionally, the example method can include isolating, by a multiplexer, each of the adjacent uplink sub-bands using separate filters. Furthermore, the example method can include filtering, by each of a plurality of single sub-band filters, a different isolated uplink sub-band in the frequency spectrum.

Further aspects of these example techniques, including related methods, devices, and computer programs, will be described further below and in reference to the following figures.

DETAILED DESCRIPTION

The present disclosure envisions a wireless receiver having front-end multiband filter architecture that uses one or more wideband uplink sub-band filters (i.e., a bandpass wideband filter that captures bandwidth that corresponds to two or more adjacent uplink sub-bands of a multiband signal) that can capture multiple adjacent receiver (RX) sub-bands in a system frequency spectrum. In addition, a small type multiplexor can be used to separate the individual uplink sub-bands, and one or more multiband notch filters can be used to suppress blocking signals that may occur between the adjacent uplink sub-bands to protect a following low noise amplifier (LNA). In this additional aspect of the filtering process, relatively small and inexpensive wideband filters can be used to filter multiple adjacent uplink sub-bands of the multiband signal in a single filtering process. The small type multiplexor and the multiband notch filters can be designed by using ceramics (i.e., ceramics-based) or Surface Acoustic Wave (SAW) filter, Bulk Acoustic Wave (BAW) filter, or Film Bulk Acoustic Resonator (FBAR) filter technologies, because they do not need to handle a high-power signal. Because ceramics filters are about 50 times smaller than air cavity filters, and the SAW, BAW, FBAR filters are about 10,000 times smaller, a significant volume, cost, and weight reduction can be obtained by utilizing the front-end architecture for the multiband radio described in the present disclosure.

The filtering approach described herein differs from those implemented by the legacy front-end receiver architectures described above, which use a much heavier and more expensive legacy air cavity filter for each captured sub-band. Thus, according to example embodiments, the filter architecture can split the uplink (also referred to herein as RX, as uplink is received from a network node perspective) signal filtering load into two parts: first filtering groups of adjacent RX sub-bands and any isolated RX sub-bands from the system frequency spectrum, and then, for any filtered sub-band groups, isolate individual sub-bands in the group using a small type multiplexor made of less expensive and lighter components that exhibit a smaller form-factor in radio implementations.

Figure 1:
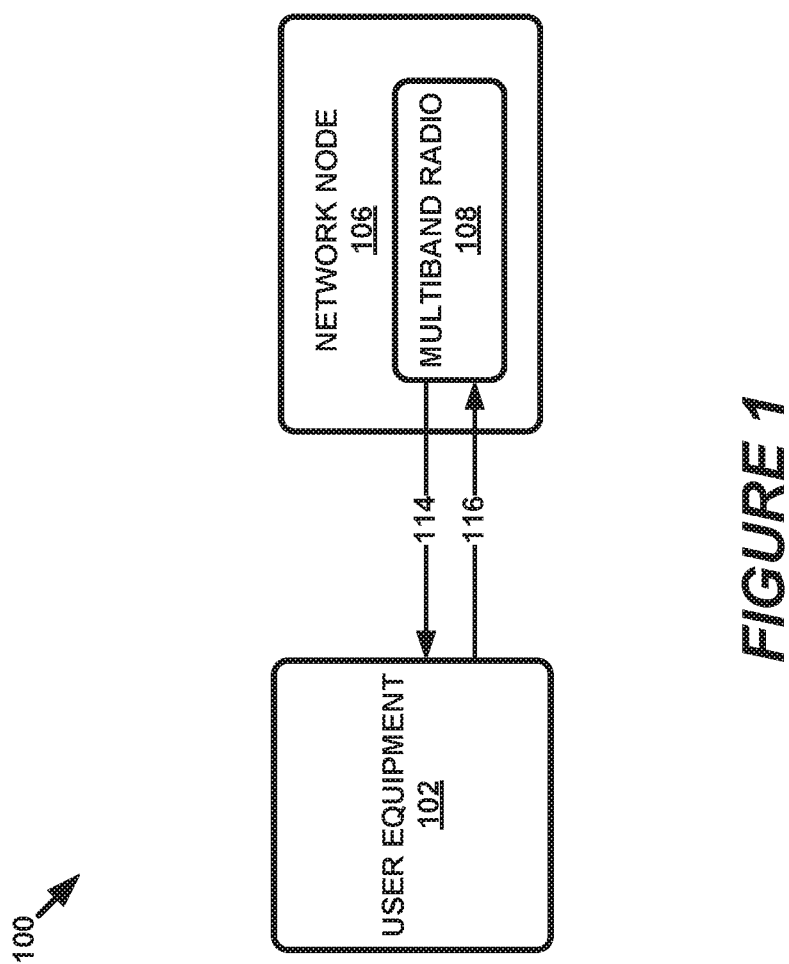
FIG. 1 illustrates a user equipment (UE) and network node communicating in a wireless communication system corresponding to example embodiments of the present disclosure.

FIG. 1 illustrates an example wireless communication system 100 that includes a UE 102 in communication with a network node 106 of an access network. In some instances, the UE 102 and the network node 106 can include multiple transmit and/or receive antennas and may be configured for MIMO communication. Accordingly, as shown in the figure, the network node 106 includes a multiband radio 108 that is configured to receive a multiband uplink signal 116 transmitted by one or more transmit antennas of UE 102. The uplink signal 116 received by the network node 106 via the multiband radio 108 can include multiple sub-bands each defining a subset of the frequency across which the uplink signal 116 is carried. These sub-bands may or may not lie adjacent to one or more other uplink sub-bands in the frequency spectrum utilized for the communication between the UE 102 and the network node 106. As the UE 102 and the network node 106 also communicate in the downlink direction via one or more downlink (or transmission, TX sub-bands from the perspective of the network node 106) some isolated sub-bands detected by the multiband radio receiver circuit may be signals transmitted by another antenna of the multiband radio 108 contemporaneously with the received sub-bands. Thus, the multiband radio 106 can contain a multiband uplink signal filter assembly to filter the downlink (TX) sub-bands from the desired uplink sub-bands (RX). As introduced above and described in further detail below, embodiments of the multiband radio 108 and its receiver assembly can be configured to incorporate wideband RX filters 206 that filter any groups or sets of adjacent uplink sub-bands, as well as isolated RX sub-bands (i.e., single sub-bands whose adjacent sub-bands do not include another RX sub-band), from the system frequency spectrum. Once these isolated RX sub-bands and RX sub-band groups have been filtered, notch filters and a small type multiplexor, both of which can be manufactured using smaller and lighter materials compared to the air cavity filters described above, can further refine the resulting signal to eventually isolate the RX sub-bands inside of the multiband radio, for instance, of a network node 106. In an aspect, as the network node 106 and UE 102 are configured to communicate wirelessly, these devices are also referred to generally as wireless communication devices.

Figure 2:
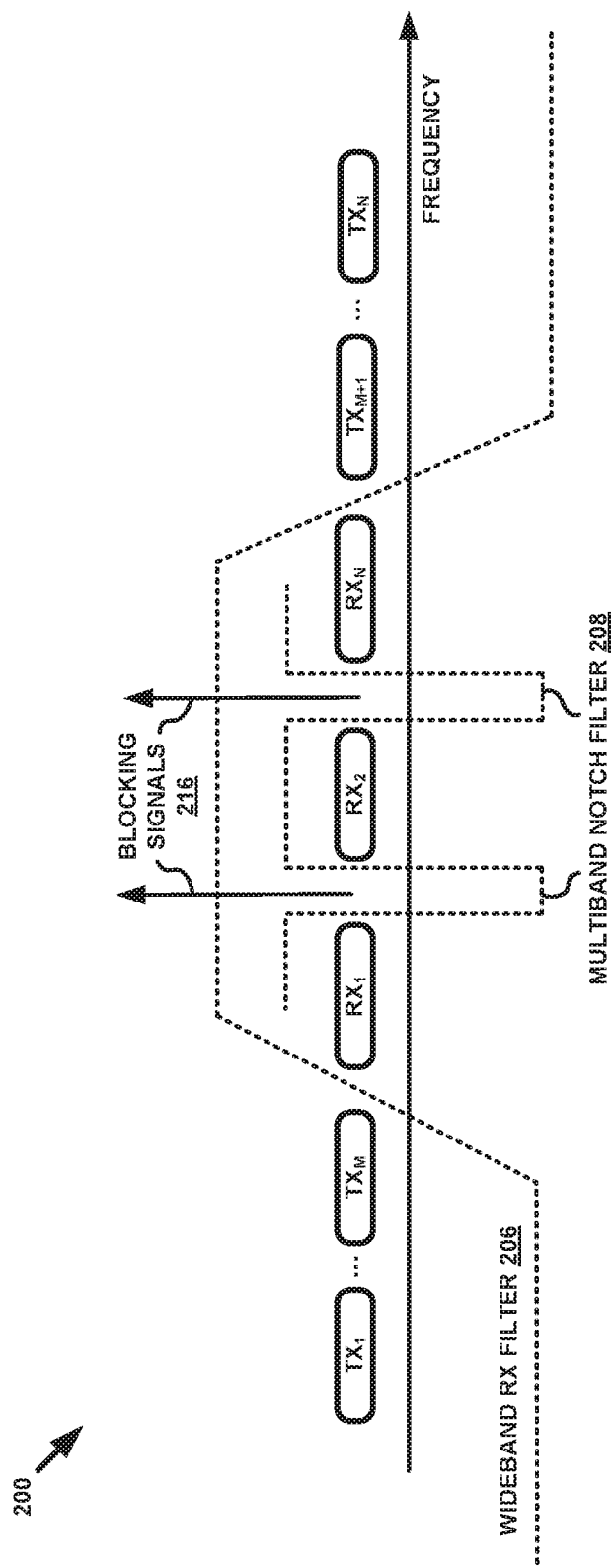
FIG. 2 illustrates effects of applying a multiband uplink signal to a wideband receiver filter according to example embodiments of the present disclosure.

FIG. 2 illustrates a sub-band configuration where three uplink sub-bands $RX_1$, $RX_2$, and $RX_N$ are positioned at the center of the available channel spectrum, surrounded on one side of the spectrum by transmit sub-bands $TX_1$ to $TX_M$ and on the opposite side, transmit sub-bands $TX_{M+1}$ to $TX_N$ (i.e., all the TX sub-bands sandwich all the RX sub-bands). Given that the signal power of signals transmitted on the TX sub-bands is much greater than the received uplink sub-bands (RX) a wideband receiver filter 206 can be utilized to isolate all of the adjacent uplink sub-bands from the surrounding downlink TX sub-bands, all while only utilizing one air cavity RX filter instead of N that would be necessary in existing implementations.

In addition to the wideband RX filter 206 isolating the adjacent uplink sub-bands $RX_1$, $RX_2$, and up to $RX_N$, the front-end multiband radio receiver can also include a small type multiplexor that is configured to isolate each of the component sub-bands that were included in the filtered multiband uplink signal obtained by wideband RX filter 206. Accordingly, by utilizing the wideband RX filter 206 in conjunction with the small type multiplexor, the multiband radio can effectively isolate each individual sub-band of the particular multiband uplink signal of FIG. 2 in two stages: (a) isolating a wideband signal made up of adjacent uplink sub-bands and (b) further isolating the individual sub-bands within the wideband signal by using a small type multiplexor component set in series with the multiband RX filter 206 of the present disclosure.

Figure 3:
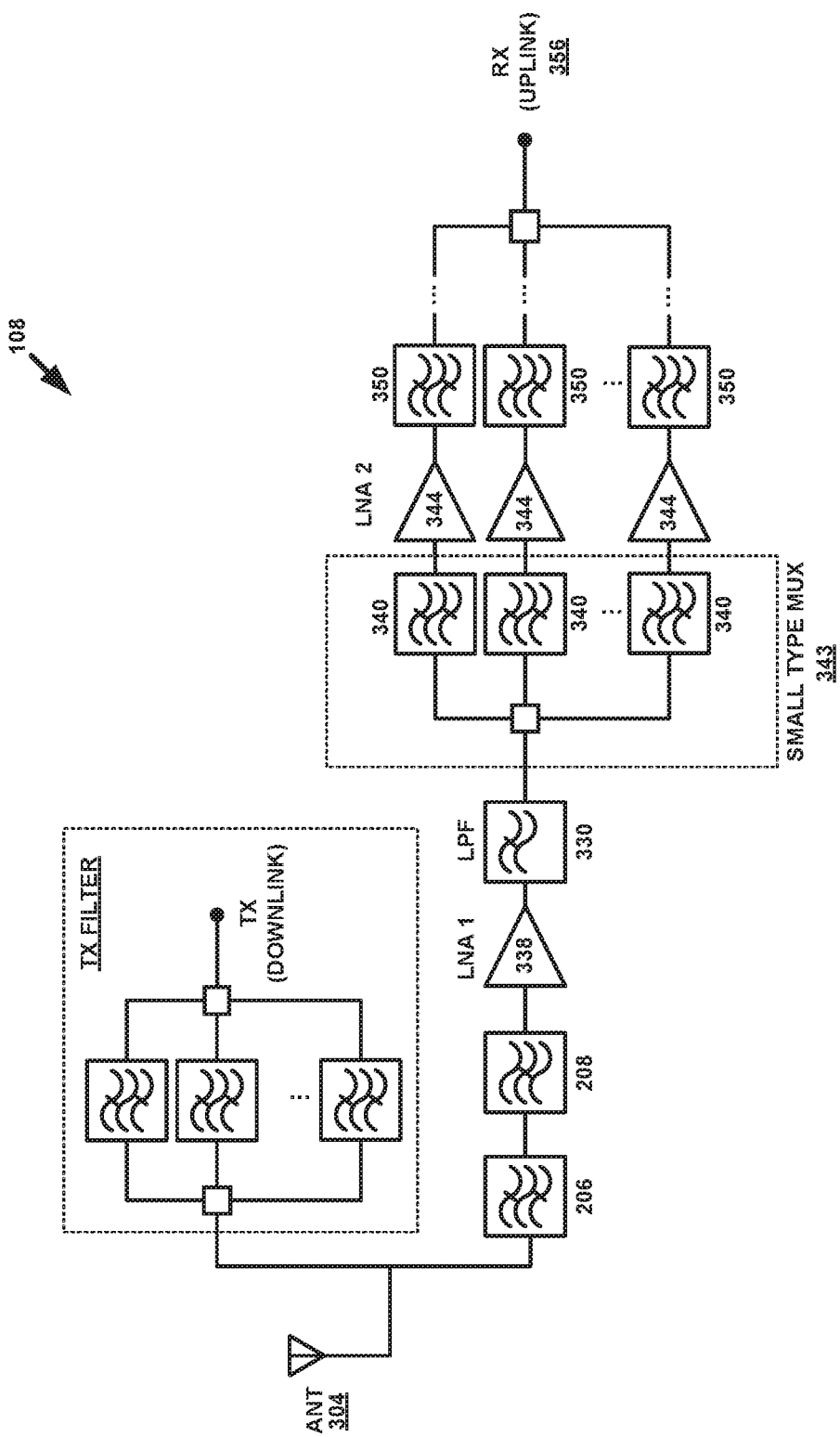
FIG. 3 illustrates a front-end architecture of a multiband radio according to example embodiments of the present disclosure.

These two stages can be seen in the multiband radio 108 circuit implementation shown in FIG. 3, along with other aspects of the front-end receiver architecture proposed herein. As shown in FIG. 3, in addition to the multiband receiver assembly proposed herein, the multiband radio circuit 108 contains a TX filter for obtaining sub-bands received at the antenna 304 that are attributed to downlink transmissions. The lower portion of the radio circuit includes multiple components that allow the multiband radio 108 to isolate each of the uplink (RX) 356 sub-bands received at the antenna 304. In the first stage discussed above, the wideband RX filter 206 can filter two or more adjacent uplink sub-bands received in the multiband signal.

Once these sub-bands are obtained, the signal can move to the one or more notch filters 208, which are optionally included in the filter circuit, for example, in instances where blocking signals 216 (see FIG. 2) are present between RX sub-bands, which could compress the first low noise amplifier (LNA 1) 338. Thus, by suppressing these blocking signals 216, the one or more notch filters 208 can help to protect the LNA 1 from experiencing these negative effects. After passing through a low-pass filter 330, the signal is multiplexed using a small type multiplexor 343, which includes several further filters to separate the combined sub-bands. In an aspect, like the optional notch filter(s) 208, the small type multiplexor 343 can be designed by using the ceramics or SAW/BAW/FBAR filter technologies because they are already isolated from the high-power DL signals of the TX sub-bands (see FIG. 2, 4). These filter types can be designed to perform sufficiently to ensure a workable degree of isolation between the RX sub-bands. Typically, signal loss in the small type multiplexor 343 will not be a significant contributor to the ultimate UL noise.

In any case, the wideband RX filter 206 is typically designed to use air cavity filter technology, because it will be required to handle high-power TX sub-band signals in sub-bands that are adjacent in its TX sub-bands. The wideband RX filter 206 of the front-end architecture shown in FIG. 3, though used to filter three RX sub-bands, will be in size as big as one of the individual single sub-band RX filters of the air cavity variety, which saves space, cost, and weight significantly. Furthermore, the wideband RX filter 206 could be smaller than any one of the individual single sub-band RX filters (such as single sub-band RX filter 410 shown in FIG. 4), because the UL front-end filtering requirements in the present disclosure are split into the two parts discussed above. As a result, the portion of the requirements assigned to the wideband RX filter 206 will be less rigorous than those imposed to any one of the individual single-sub-band RX filters. Therefore, the air cavity front-end RX filter used in the present front-end architecture can be on the order of approximately 1/n the size of conventional air cavity front end filters, where n is the number of the sub-bands.

In an additional improvement, the wideband RX filter 206 of the present disclosure can exhibit 0.2 to 0.6 dB less loss than the conventional multiband RX filter. This is because the conventional filter requires n band-combining circuits to combine the n individual single-band RX filters. Moreover, if the multiband notch filter 208 of FIGS. 2 and 3 is not needed, then the front-end architecture exhibits an improved UL noise figure, mainly due to a lower loss of the wideband RX filter 206 explained above.

Figure 4:
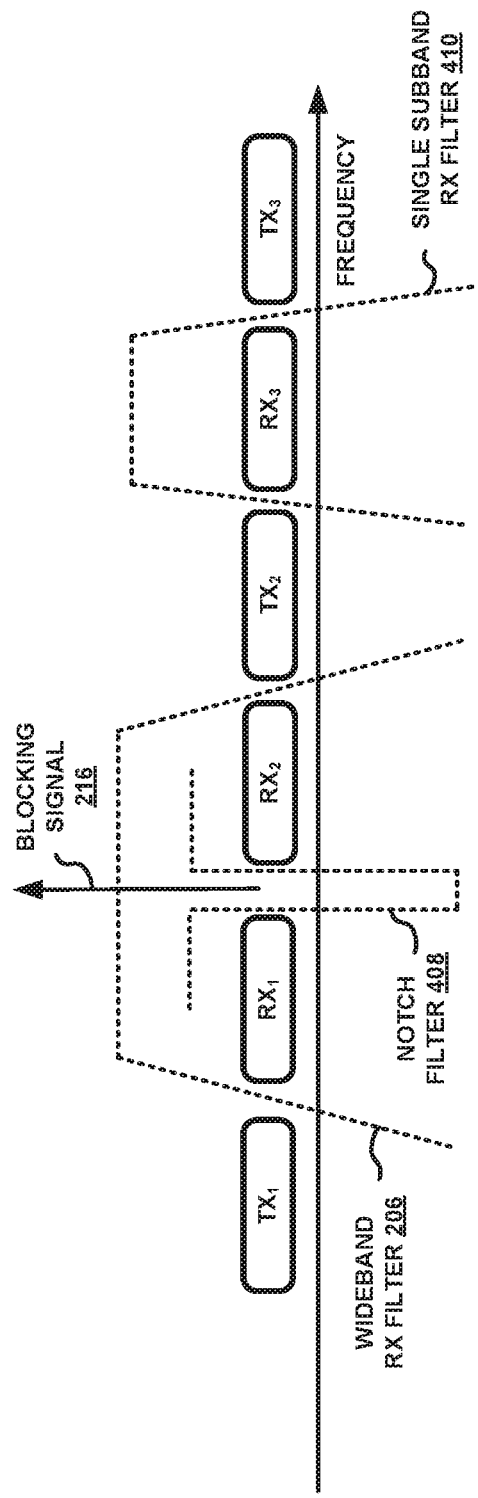
FIG. 4 illustrates effects of applying a multiband uplink signal to a wideband receiver filter and a single sub-band filter according to example embodiments of the present disclosure.

FIG. 4 illustrates an additional possible scenario where the multiband signal includes two or more adjacent RX sub-bands and at least one isolated RX sub-band having no adjacent RX sub-bands. As shown in the figure, if two or more adjacent RX sub-bands exist, then a wideband RX filter 206 can be designed to filter the group of adjacent RX sub-bands. In FIG. 4, these adjacent uplink sub-bands are $RX_1$ and $RX_2$. Like the example in FIG. 2, if there is a blocking signal 216 between these adjacent RX sub-bands, then a multiband notch filter 408 can be designed and placed after the wideband RX filter 206 (see FIG. 5) to suppress these blocking signals.

In addition, FIG. 4 shows a sub-band combination of a triple sub-band multiband radio that has TX 2 sub-band sandwiched by $RX_2$ and $RX_3$, but $RX_1$ and $RX_2$ are adjacent. In this case, a wideband RX filter 206 can be designed to filter, together, $RX_1$ and $RX_2$. Unlike the example presented in FIG. 2, where all of the RX sub-bands were grouped adjacently, the example presented in FIG. 4 requires a further air cavity front-end RX filter, shown in the figure as single sub-band RX filter 410. The wideband filter 206 and the single sub-band filter 410 can be designed together as a dual-band air cavity filter 412. In other words, compared to the conventional architecture that will have three individual single sub-band RX filters 410 used to form the necessary front-end RX filter, the proposed architecture requires only two sub-band RX filters to form the front-end RX filter. Therefore, even in the relatively simple example shown in FIG. 4, utilizing aspects of the present disclosure will save an entire air cavity sub-band filter.

Figure 5:
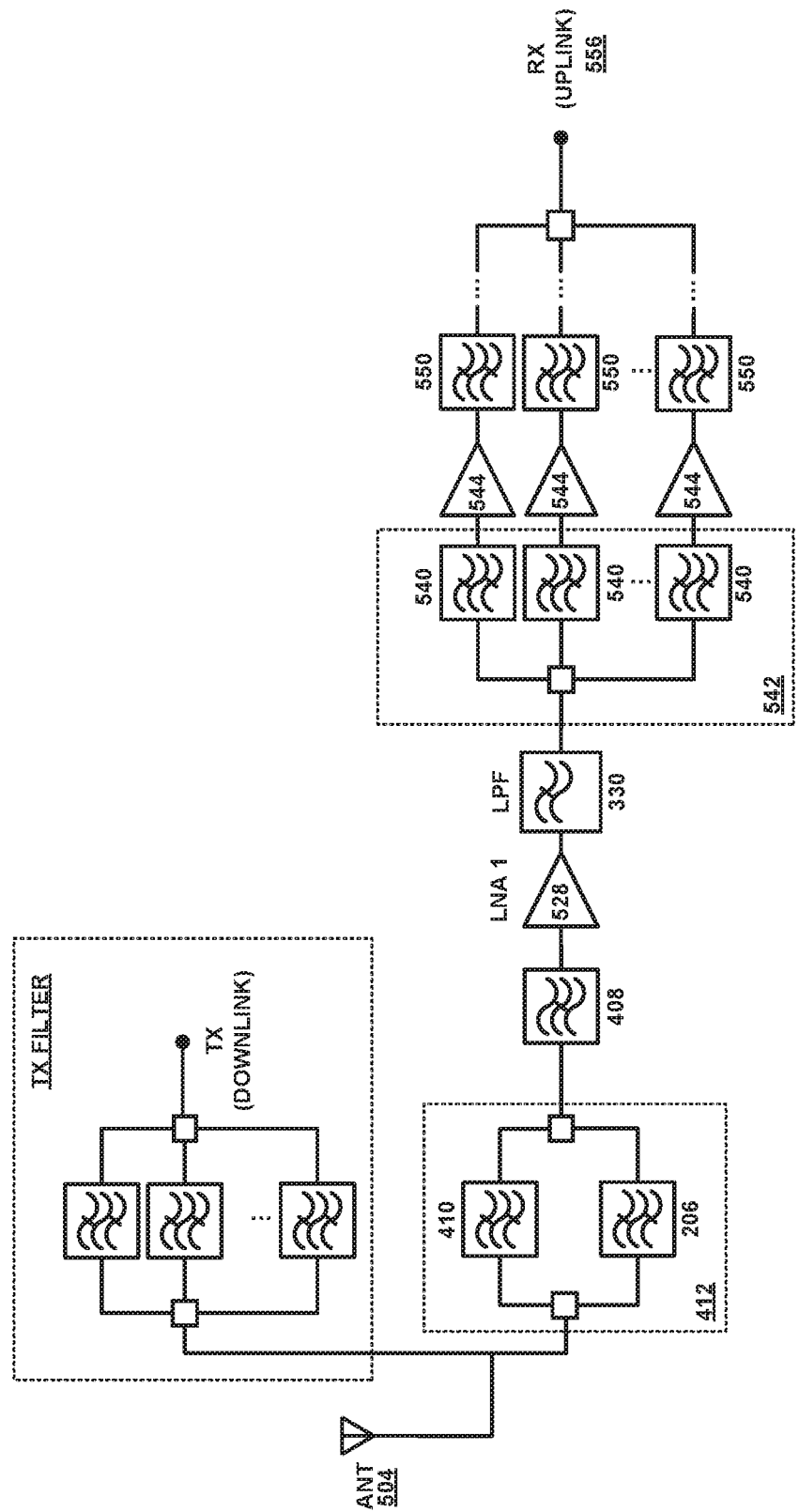
FIG. 5 illustrates a front-end architecture of a multiband radio according to example embodiments of the present disclosure.

As described above in reference to other examples, should a blocking signal 216 exist between adjacent uplink sub-bands $RX_1$ and $RX_2$, a notch filter 408 can be designed and implemented in the front-end of the multiband radio example shown in FIG. 5. Specifically, this notch filter 408 can be placed between (a) the parallel arrangement of the wideband RX filter 206 and the single sub-band RX filter 410 and (b) the LNA 1 528. Like the exemplary front-end architecture of the multiband radio 108 of FIG. 3, the corresponding architecture in FIG. 5 is arranged such that UL front-end filtering requirements are split mainly into two parts: (a) a first part where the air cavity dual-band RX filter 206 and air cavity single-sub-band RX filter 410 filter pass their respective RX sub-bands signal and (b) a second part where the filtered signal from the first part is input to a small type triplexer 542 that is placed between the LNA 1 528 and one or multiple LNA 2s 544, as shown in FIG. 5. Furthermore, both the notch filter 408 and the components of the small type triplexer 542 (e.g., filters 540) can be designed to use ceramics or the SAW/BAW/FBAR filter technologies.

Figure 6:
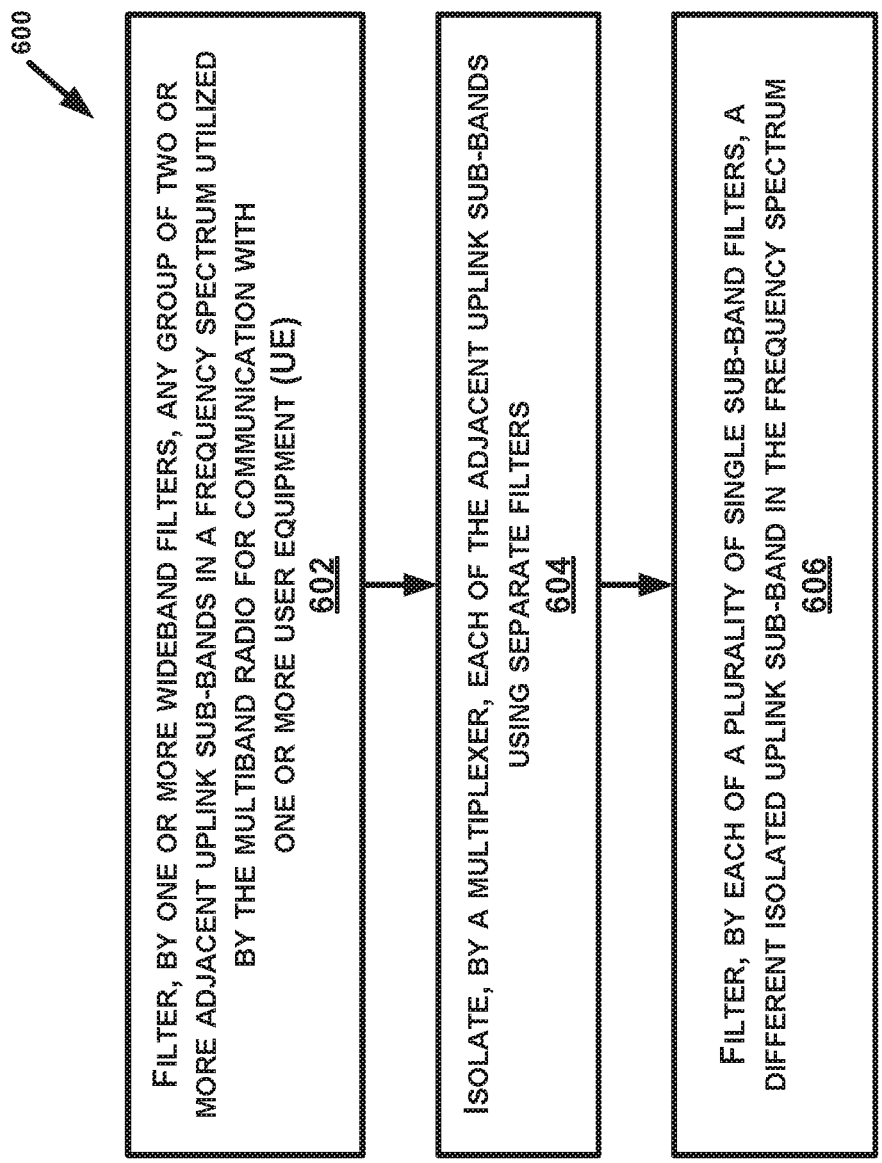
FIG. 6 illustrates a method performed by a multiband radio according to one or more embodiments.

FIG. 6 presents an example method 600 performed by a multiband radio 108 for filtering a set of uplink sub-bands in a wireless communication system. The method can include, at block 602, filtering, by one or more wideband filters of the multiband receiver, any group of two or more adjacent uplink sub-bands in a frequency spectrum utilized by the multiband radio for communication with one or more UEs 102. In addition, at block 604, the method 600 can include isolating, by a multiplexor of the multiband receiver, each of the adjacent uplink sub-bands using separate filters. Furthermore, the method 600 can further include filtering, by each of a plurality of single sub-band filters, different isolated uplink sub-bands in the frequency spectrum, as is shown in relation to the single sub-band RX filter 410 in FIGS. 4 and 5.

In addition, although not explicitly shown in FIG. 6, the following optional aspects may be included in one or more example embodiments of the present disclosure. For instance, some examples of method 600 can include utilizing multiband notch filters to mitigate blocking signals between adjacent uplink sub-bands. In addition, the method 600 can include amplifying any of the set of sub-bands using one or more low noise amplifiers.

With the above description in mind, let us turn to FIGS. 7A, 7B, 8A, and 8B, which present example aspects of a network node 106 and multiband radio 108, respectively, that are configured to carry out the techniques and methods presented herein.

Figure 7B:
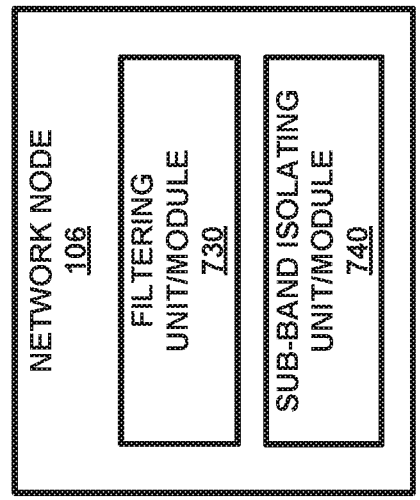
FIGS. 7A and 7B illustrate aspects of an example network node in example embodiments of the present invention.
Figure 7A:
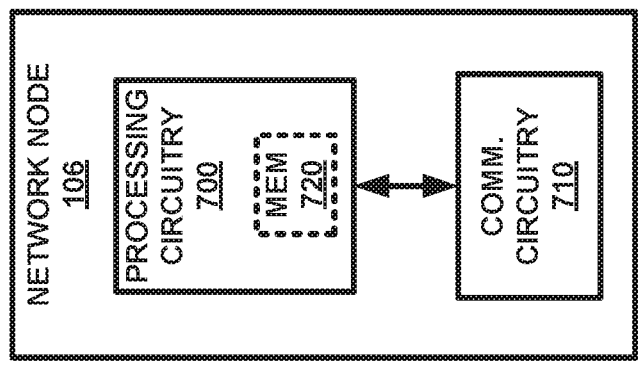

FIG. 7A illustrates additional details of an example network node 106 of a wireless communication system 100 according to one or more embodiments. The network node 106 is configured, e.g., via functional means or units (also may be referred to as modules or components herein), to implement processing to perform certain aspects described above in reference to at least the aspects of FIGS. 1-6. As shown in FIG. 7B, the network node 106 in some embodiments for example includes means, modules, components, or units 730 and 740 (among other possible means, modules, components, or units not shown explicitly in FIG. 7B) for performing aspects of these techniques. In some examples, these means, modules, components, or units can be realized in processing circuitry 700. Specifically, the functional means or units of the network node 106 may include a filtering unit/module 730 configured to a filter any group of two or more adjacent uplink sub-bands in a frequency spectrum utilized by the multiband radio for communication with a user equipment, for example, as performed in block 602 of FIG. 6, above. In addition, the network node 106 can include an isolating unit/module 740 configured to isolate each of the two of more adjacent uplink sub-bands using separate filters, for example, as performed in block 604 of FIG. 6, above.

In at least some embodiments, the network node 106 comprises processing circuits 700, which may include one or more processing circuits, configured to implement techniques described in reference to method 600 presented in FIG. 6 and certain associated processing of the features described in relation to FIG. 6 and/or other figures, such as by implementing functional means or units above (or those not explicitly shown). In one embodiment, for example, the processing circuit(s) 700 implements functional means or units as respective circuits. The circuits in this regard may comprise circuits dedicated to performing certain functional processing and/or one or more microprocessors in conjunction with memory 720. In embodiments that employ memory 720, which may comprise one or several types of memory such as read-only memory (ROM), random-access memory, cache memory, flash memory devices, optical storage devices, etc., the memory 720 stores program code that, when executed by the one or more for carrying out one or more microprocessors, carries out the techniques described herein.

In one or more embodiments, the network node 106 also comprises communication circuitry 710. The communication circuitry 710 includes various components (e.g., antennas) for sending and receiving data and control signals. More particularly, the circuitry 710 includes a transmitter that is configured to use known signal processing techniques, typically according to one or more standards, and is configured to condition a signal for transmission (e.g., over the air via one or more antennas). Similarly, the communication circuitry 710 includes a receiver that is configured to convert signals received (e.g., via the antenna(s)) into digital samples for processing by the one or more processing circuits. In some examples, this communication circuitry 710 may include multiband radio 108 of FIG. 1.

Figure 8A:
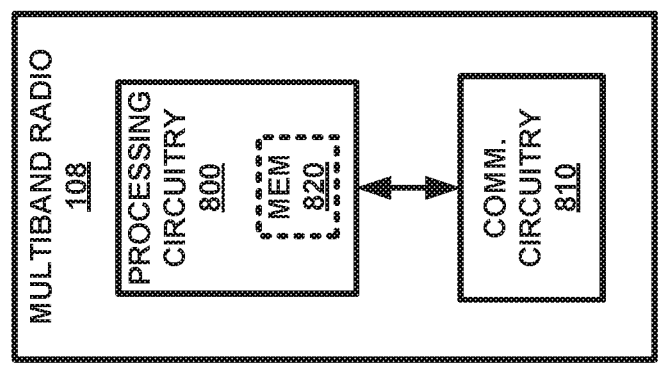
FIGS. 8A and 8B illustrate aspects of an example UE in example embodiments of the present invention.
Figure 8B:
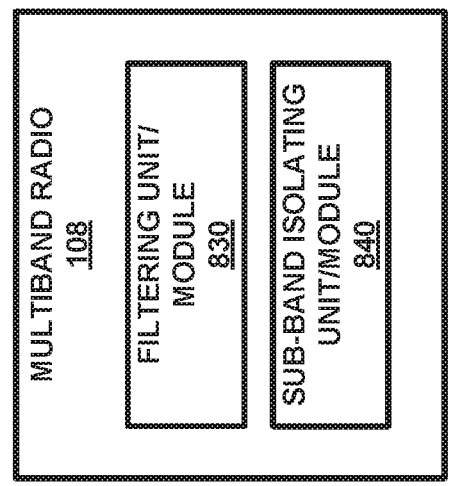

FIG. 8A illustrates additional details of an example multiband radio 108 of a wireless communication system 100 according to one or more embodiments. The multiband radio 108 is configured, e.g., via functional means or units (also may be referred to as modules or components herein), to implement processing to perform certain aspects described above in reference to at least the aspects of FIGS. 1-6. As shown in FIG. 8B, the multiband radio 108 in some embodiments for example includes means, modules, components, or units 830 and/or 840 (among other possible means, modules, components, or units not shown explicitly in FIG. 8B) for performing aspects of the techniques described above. In some examples, these means, modules, components, or units can be realized in processing circuitry 800. Specifically, the functional means or units of the multiband radio 108 may include a filtering unit/module 830 configured to a filter any isolated sub-bands or any group of two or more adjacent uplink sub-bands in a frequency spectrum utilized by the multiband radio for communication with a user equipment, for example, as performed in blocks 602 and 606 of FIG. 6, above. In addition, the multiband radio 108 can include an isolating unit/module 840 configured to isolate each of the two or more adjacent uplink sub-bands using separate filters, for example, as performed in block 604 of FIG. 6, above.

In at least some embodiments, the multiband radio 108 comprises one or more processing circuitry/circuits 800 configured to implement processing of the method 600 presented in FIG. 6 and certain associated processing of the features described in relation to FIG. 6 and other figures, such as by implementing functional means or units above. In one embodiment, for example, the processing circuit(s) 800 implements functional means or units as respective circuits. The circuits in this regard may comprise circuits dedicated to performing certain functional processing and/or one or more microprocessors in conjunction with memory 820. In embodiments that employ memory 820, which may comprise one or several types of memory such as read-only memory (ROM), random-access memory, cache memory, flash memory devices, optical storage devices, etc., the memory 820 stores program code that, when executed by the one or more for carrying out one or more microprocessors, carries out the techniques described herein.

In one or more embodiments, the multiband radio 108 also comprises communication circuitry 810. The communication circuitry 810 includes various components (e.g., antennas) for sending and receiving data and control signals. More particularly, the circuitry 510 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits.

In an aspect, the multiband radio 108 may correspond to any mobile (or even stationary) device that is configured to receive/consume user data from a network-side infrastructure, including laptops, phones, tablets, IoT devices, etc. Thus, multiband radio 108 is any type device capable of communicating with a network node 106 over radio signals, such as, but not limited to, a device capable of performing autonomous wireless communication with one or more other devices, including a machine-to-machine (M2M) device, a machine-type communications (MTC) device, a user equipment (UE) (however it should be noted that the UE does not necessarily have a "user" in the sense of an individual person owning and/or operating the device). An UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

Those skilled in the art will also appreciate that embodiments herein further include corresponding computer programs. A computer program comprises instructions which, when executed on at least one processor of the network node 106 or multiband radio 108, cause these devices to carry out any of the respective processing described above. Furthermore, the processing or functionality of network node 106 or multiband radio 108 may be considered as being performed by a single instance or device or may be divided across a plurality of instances of network node 106 or multiband radio 108 that may be present in a given system such that together the device instances perform all disclosed functionality. Embodiments further include a carrier containing such a computer program. This carrier may comprise one of an electronic signal, optical signal, radio signal, or computer readable storage medium. A computer program in this regard may comprise one or more code modules corresponding to the means or units described above.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A multiband radio configured to filter a set of uplink sub-bands in a wireless communication system, comprising:

one or more wideband filters, each of the one or more wideband filters configured to filter any group of two or more adjacent uplink sub-bands in a frequency spectrum utilized by the multiband radio for communication with one or more user equipment;

a multiplexer configured to isolate each of the adjacent uplink sub-bands using separate filters; and a plurality of single sub-band filters, each of the plurality of single sub-band filters configured to filter a different isolated uplink sub-band in the frequency spectrum.

2. The multiband radio of claim 1, further comprising one or more multiband notch filters configured to mitigate blocking signals between the adjacent uplink sub-bands.

3. The multiband radio of claim 1, wherein each of the one or more wideband filters and/or each of the plurality of single sub-band filters comprises an air cavity filter.

4. The multiband radio of claim 1, further comprising a low-pass filter.

5. The multiband radio of claim 1, wherein the multiplexer comprises one or more of Surface Acoustic Wave (SAW) filters, Bulk Acoustic Wave (BAW) filters, and Film Bulk Acoustic Resonator (FBAR) filters.

6. The multiband radio of claim 1, wherein the multiplexer comprises one or more ceramics filters.

7. The multiband radio of claim 1, further comprising one or more low-noise amplifiers configured to amplify any of the set of uplink sub-bands.

8. A network node in a wireless communication system, the network node comprising a multiband radio configured to filter a set of uplink sub-bands in a wireless communications system, the multiband radio comprising:

one or more wideband filters, each of the one or more wideband filters configured to filter any group of two or more adjacent uplink sub-bands in a frequency spectrum utilized by the multiband radio for communication with one or more user equipment;

a multiplexer configured to isolate each of the adjacent uplink sub-bands using separate filters; and a plurality of single sub-band filters, each of the plurality of single sub-band filters configured to filter a different isolated uplink sub-band in the frequency spectrum.

9. The network node of claim 8, wherein the multiband radio further comprises one or more multiband notch filters configured to mitigate blocking signals between the adjacent uplink sub-bands.

10. The network node of claim 8, wherein each of the one or more wideband filters and/or each of the plurality of single sub-band filters comprises an air cavity filter.

11. The network node of claim 8, wherein the multiband radio further comprises a low-pass filter.

12. The network node of claim 8, wherein the multiplexer comprises one or more of Surface Acoustic Wave (SAW) filters, Bulk Acoustic Wave (BAW) filters, and Film Bulk Acoustic Resonator (FBAR) filters.

13. The network node of claim 8, wherein the multiplexer comprises one or more ceramics filters.

14. The network node of claim 8, wherein the multiband radio further comprises one or more low-noise amplifiers configured to amplify any of the set of uplink sub-bands.

15. A wireless communication device comprising a multiband radio configured to filter a set of uplink sub-bands in a wireless communication system, the multiband radio comprising:

one or more wideband filters, each of the one or more wideband filters configured to filter any group of two or more adjacent uplink sub-bands in a frequency spectrum utilized by the multiband radio for communication with one or more user equipment;

a multiplexer configured to isolate each of the adjacent uplink sub-bands using separate filters; and a plurality of single sub-band filters, each of the plurality of single sub-band filters configured to filter a different isolated uplink sub-band in the frequency spectrum.

16. The wireless communication device of claim 15, wherein the multiband radio further comprises one or more multiband notch filters configured to mitigate blocking signals between adjacent uplink sub-bands.

17. The wireless communication device of claim 15, wherein each of the one or more wideband filters and/or each of the plurality of single sub-band filters comprises an air cavity filter.

18. The wireless communication device of claim 15, wherein the multiband radio further comprises a low-pass filter.

19. The wireless communication device of claim 15, wherein the multiplexer comprises one or more of Surface Acoustic Wave (SAW) filters, Bulk Acoustic Wave (BAW) filters, and Film Bulk Acoustic Resonator (FBAR) filters.

20. The wireless communication device of claim 15, wherein the multiplexer comprises one or more ceramics filters.

21. The wireless communication device of claim 15, wherein the multiband radio further comprises one or more low-noise amplifiers configured to amplify any of the set of uplink sub-bands.

22. A method performed by a multiband radio for filtering a set of uplink sub-bands in a wireless communication system, the method comprising:

filtering, by one or more wideband filters, any group of two or more adjacent uplink sub-bands in a frequency spectrum utilized by the multiband radio for communication with a user equipment (UE);

isolating, by a multiplexer, each of the adjacent uplink sub-bands using separate filters; and filtering, by each of a plurality of single sub-band filters, a different isolated uplink sub-band in the frequency spectrum.

23. The method of claim 22, further comprising mitigating, by one or more multiband notch filters, blocking signals between adjacent uplink sub-bands.

24. The method of claim 22, wherein each of the one or more wideband filters and/or each of the plurality of single sub-band filters comprises an air cavity filter.

25. The method of claim 22, further comprising utilizing a low-pass filter in the multiband radio.

26. The method of claim 22, wherein the multiplexer comprises one or more of Surface Acoustic Wave (SAW) filters, Bulk Acoustic Wave (BAW) filters, and Film Bulk Acoustic Resonator (I-BAR) filters.

27. The method of claim 22, wherein the multiplexer comprises one or more ceramics filters.

28. The method of claim 22, further comprising amplifying any of the set of uplink sub-bands using one or more low-noise amplifiers.

* * * * *